United States Patent
Mallik et al.

(10) Patent No.: US 8,817,924 B2
(45) Date of Patent: Aug. 26, 2014

(54) ITERATIVE PILOT TONE CANCELLATION FOR IMPROVED CHANNEL ESTIMATION AND DECODING

(75) Inventors: Siddhartha Mallik, San Diego, CA (US); Taesang Yoo, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 210 days.

(21) Appl. No.: 13/237,469

(22) Filed: Sep. 20, 2011

(65) Prior Publication Data

US 2012/0243484 A1 Sep. 27, 2012

Related U.S. Application Data

(60) Provisional application No. 61/385,780, filed on Sep. 23, 2010.

(51) Int. Cl.
*H03D 1/04* (2006.01)
*H04B 7/00* (2006.01)

(52) U.S. Cl.
USPC .......................................... 375/346; 455/513

(58) Field of Classification Search
CPC ................... H04L 25/03318; H04L 25/03324; H04W 72/06; H04W 41/00; H04W 1/00
USPC ......... 370/318, 329, 342, 468, 395.21, 395.4; 375/259, 130, 346, 224, 295, 267, 347; 455/422.1, 562.1
See application file for complete search history.

(56) References Cited

U.S. PATENT DOCUMENTS

| 7,623,602 | B2 * | 11/2009 | Guess et al. ................... 375/347 |
| 8,351,532 | B2 * | 1/2013 | Cheng et al. ................... 375/267 |
| 2008/0298524 | A1 | 12/2008 | Koorapaty et al. |

(Continued)

FOREIGN PATENT DOCUMENTS

| WO | WO2006004948 | 1/2006 |
| WO | WO2009078603 | 6/2009 |
| WO | WO2009099810 | 8/2009 |
| WO | WO 2010106549 A2 * | 9/2010 |

OTHER PUBLICATIONS

Tang et al., "Pilot-Channel Aided SIC for Uplink WCDMA Systems over Multipath Fading Channels", Transactions on Electrical Eng., Electronics, and Communications, ECTI-EEC, 3(2), pp. 140-147 (Aug. 2005).
International Search Report and Written Opinion—PCT/US2011/052928—ISA/EPO—Dec. 27, 2011.

(Continued)

*Primary Examiner* — Hanh N Nguyen
(74) *Attorney, Agent, or Firm* — Seyfarth Shaw LLP

(57) ABSTRACT

Channel estimation is performed in a wireless network through cell/antenna pair ranking and iterative soft cancellation of pilot signals. Cell classification and ordering may be ranked and grouped for purposes of improving performance by dedicating hardware resources to higher priority received signals. A metric may be computed to rank the pairs. One such metric is reference signal (RS) power. Pairs may also be grouped into groups of pairs. Groups may be ordered by time-frequency resource and designated as serving-cell groups or non-serving cell groups. Higher priority pairs may be assigned a higher number of iterations. Higher priority groups may be processed first. Pairs which fall below a certain power threshold may be assigned no iterations. Iterations are distributed among hardware blocks to improve processing efficiency. Iteration numbers and hardware assignments may be modified to reach a desired complexity constraint.

20 Claims, 9 Drawing Sheets

(56) References Cited

U.S. PATENT DOCUMENTS

| | | |
|---|---|---|
| 2009/0080495 A1 | 3/2009 | Kwak et al. |
| 2010/0208854 A1* | 8/2010 | Guess et al. ............... 375/347 |
| 2010/0220651 A1* | 9/2010 | Chen et al. ................. 370/328 |
| 2010/0272220 A1 | 10/2010 | Murai et al. |
| 2011/0092195 A1* | 4/2011 | Hussein et al. ............. 455/418 |
| 2011/0126072 A1 | 5/2011 | Yoshimoto et al. |
| 2011/0164517 A1 | 7/2011 | Shepherd et al. |

OTHER PUBLICATIONS

Zummo, Salam. A., et al., "An algorithm for iterative decoding and channel estimation of space-time coded FH systems", Military Communications Conference. MILCOM 2002. Proceedings. Anaheim, CA, Oct. 7-10, 2002; [IEEE Military Communications Conference], New York, NY: IEEE; US, vol. 2, Oct. 7, 2002, pp. 768-773, XP010631871, DOI: 10.1109/MILCOM.2002.1179570 ISBN: 978-0-7803-7625-0 abstract section 111.

* cited by examiner

ITERATIVE PILOT TONE CANCELLATION FOR IMPROVED CHANNEL ESTIMATION AND DECODING

CROSS-REFERENCE TO RELATED APPLICATION

This application claims the benefit of U.S. provisional patent application No. 61/385,780 filed Sep. 23, 2010, in the names of MALLIK, et al., the disclosure of which is expressly incorporated herein by reference in its entirety.

BACKGROUND

1. Field

Aspects of the present disclosure relate generally to wireless communication systems and, more particularly to, iterative pilot tone cancellation for improved channel estimation and decoding.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects relate to the estimation of a serving channel by a UE. In various aspects, channel estimation is performed in a wireless network through cell/antenna pair ranking and iterative cancellation techniques. Cell/antenna pair classification, ordering, ranking, and grouping may provide improved techniques for assigning higher priority resources or greater quantities of resources to higher priority pairs or groups. Pairs or groups which fall below a certain power threshold may be assigned few or no resources. Furthermore, processing iterations may be distributed among available resources to improve processing efficiency or reach a desired complexity constraint.

Offered is a method of wireless communication. The method includes determining cell-antenna pairs associated with received transmissions in a received signal. The method also includes grouping the cell-antenna pairs into groups. Each group includes cell-antenna pairs with colliding pilot tones. The method also includes ranking the groups according to a determined metric. The method further includes assigning a number of iterations to each ranked group. The method still further includes performing channel estimation using iterative cancellation. In the iterative cancellation, received transmissions from cell-antenna pairs in a higher ranked group are iterated first, and received transmissions from cell-antenna pairs are iterated over their assigned number of times.

Offered is an apparatus for wireless communication. The apparatus includes means for determining cell-antenna pairs associated with received transmissions in a received signal. The apparatus also includes means for grouping the cell-antenna pairs into groups. Each group includes cell-antenna pairs with colliding pilot tones. The apparatus also includes means for ranking the groups according to a determined metric. The apparatus further includes means for assigning a number of iterations to each ranked group. The apparatus still further includes means for performing channel estimation using iterative cancellation. In the iterative cancellation, received transmissions from cell-antenna pairs in a higher ranked group are iterated first, and received transmissions from cell-antenna pairs are iterated over their assigned number of times.

Offered is a computer program product for wireless communication in a wireless network. The computer program product includes a non-transitory computer-readable medium having non-transitory program code recorded thereon. The program code includes program code to determine cell-antenna pairs associated with received transmissions in a received signal. The program code also includes program code to group the cell-antenna pairs into groups. Each group includes cell-antenna pairs with colliding pilot tones. The program code also includes program code to rank the groups according to a determined metric. The program code further includes program code to assign a number of iterations to each ranked group. The program code still further includes program code to perform channel estimation using iterative cancellation. In the iterative cancellation, received transmissions from cell-antenna pairs in a higher ranked group are iterated first, and received transmissions from cell-antenna pairs are iterated over their assigned number of times.

Offered is an apparatus for wireless communication. The apparatus includes a memory and a processor(s) coupled to the memory. The processor(s) is configured to determine cell-antenna pairs associated with received transmissions in a received signal. The processor(s) is also configured to group the cell-antenna pairs into groups. Each group including cell-antenna pairs with colliding pilot tones. The processor(s) is also configured to rank the groups according to a determined metric. The processor(s) is further configured to assign a number of iterations to each ranked group. The processor(s) is still further configured to perform channel estimation using iterative cancellation. In the iterative cancellation, received transmissions from cell-antenna pairs in a higher ranked group are iterated first, and received transmissions from cell-antenna pairs are iterated over their assigned number of times.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (ETA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
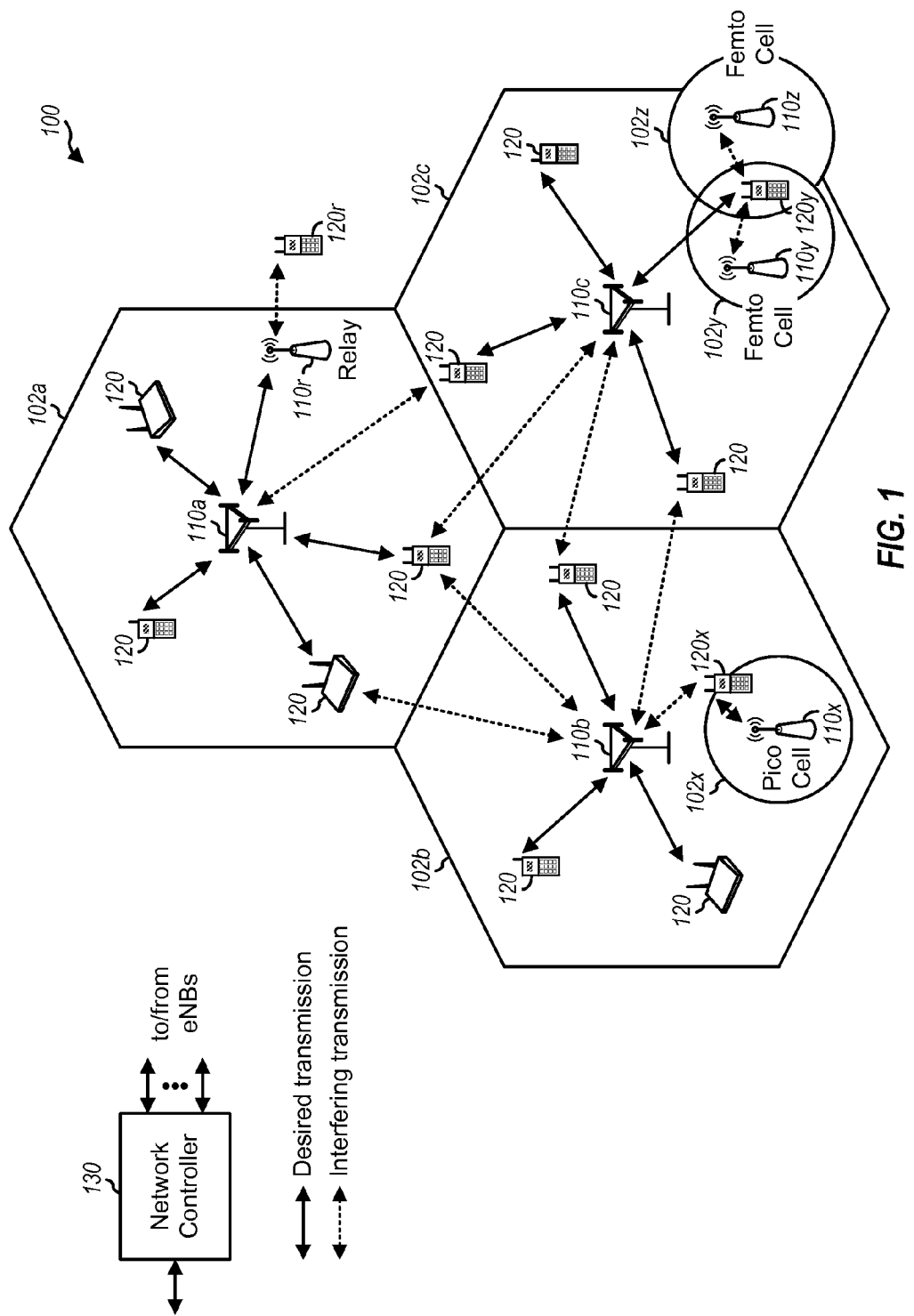
FIG. 1 is a block diagram conceptually illustrating an example of a telecommunications system.

FIG. 1 shows a wireless communication network 100, which may be an LTE-A network, in which iterative pilot tone cancellation may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous operation. For synchronous operation, the eNodeBs may have similar frame timing, and transmissions from different eNodeBs may be approximately aligned in time.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

Figure 2:
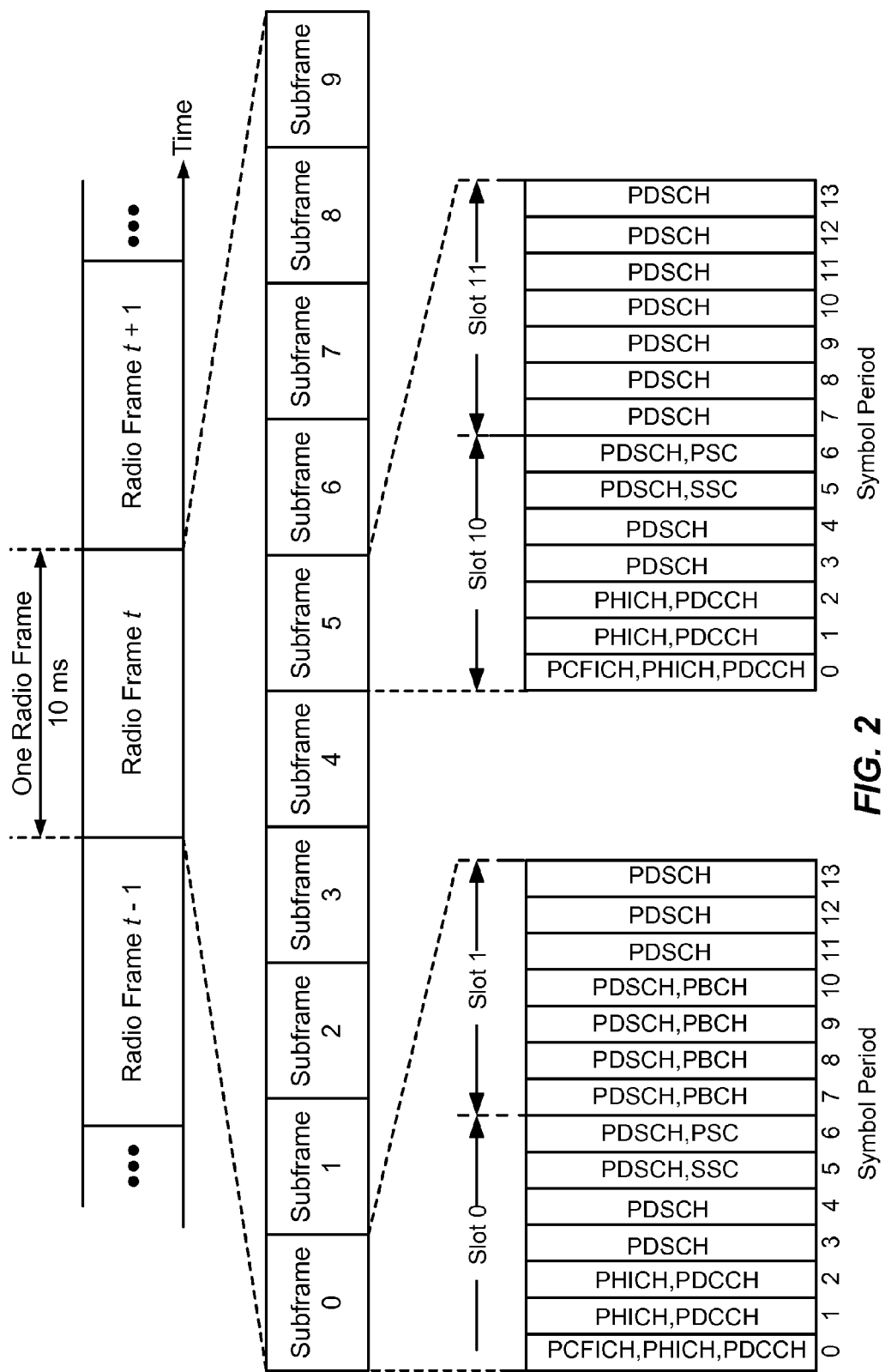
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2 L symbol periods in each subframe may be assigned indices of 0 through 2 L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
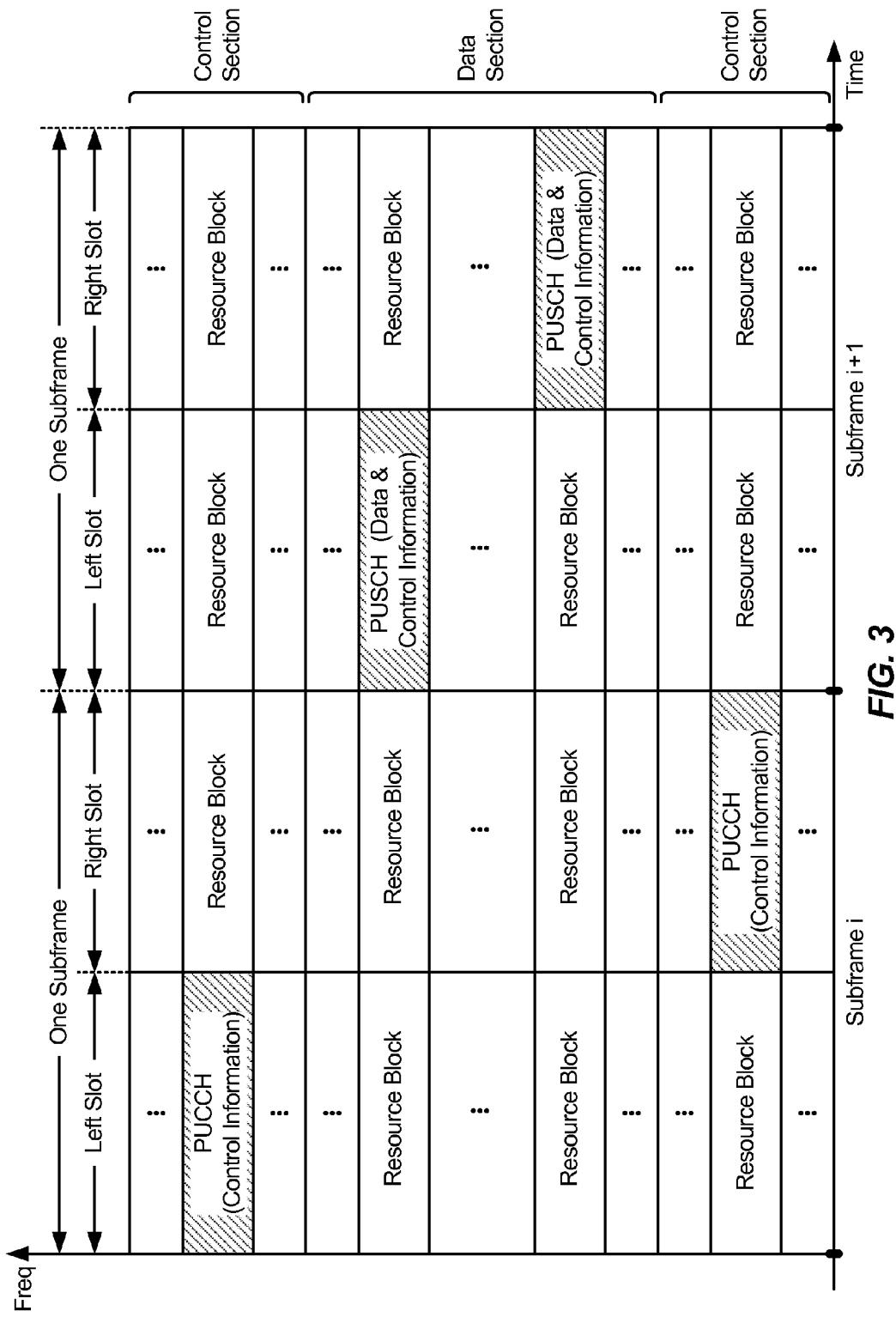
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

Figure 4:
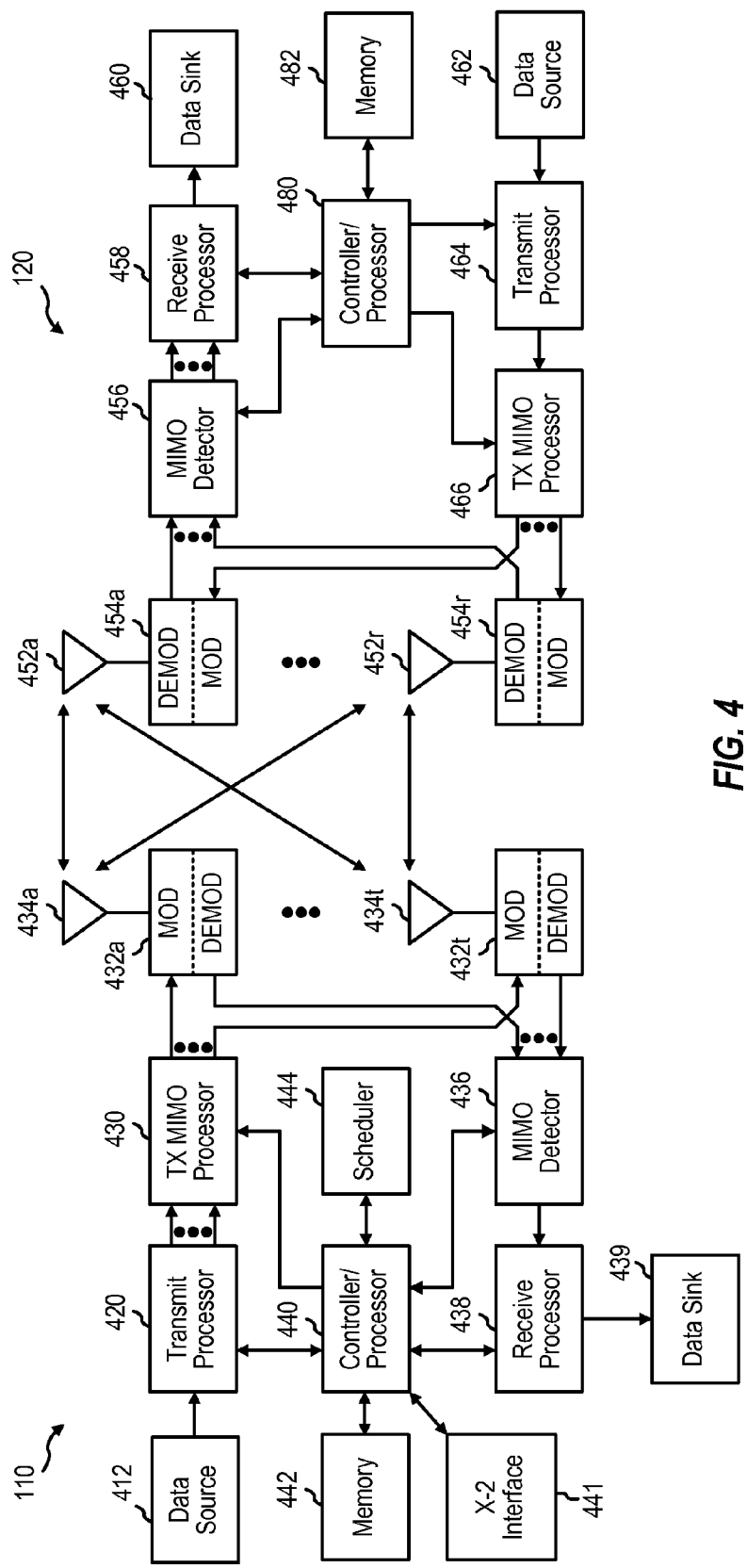
FIG. 4 is a block diagram conceptually illustrating a design of a base station/eNodeB and a UE configured according to an aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart shown in FIG. 5, and/or other processes for the techniques described herein. The memories 442 and 482 may store data and program codes for the base station 110 and the UE 120, respectively. A scheduler 444 may schedule UEs for data transmission on the downlink and/or uplink.

A number of methods may be employed to estimate a serving channel by a UE. One method is iterative soft cancellation of pilot signals. Such iterative cancellation occurs as described below. A channel is estimated using the equation:

$$y = h_1 x_1 + h_2 x_2 + n$$

where y is the received signal, $x_i$ indicates known pilot signals, $h_i$ indicates channel gain, and n indicates thermal noise. In a first iteration, $f_1$, the estimate of $h_1$ is calculated from y. The estimated interference caused by $h_1 x_1$ may then be cancelled from y. $f_2$, the estimate of $h_2$ is then calculated from $y - f_1 x_1$. In a second iteration, a new $f_1$ (the estimate of $h_1$) is calculated from $y - f_2 x_2$. A new $f_2$ (the estimate of $h_2$) is calculated from $y - f_1 x_1$. These calculations may continue for N iterations where N is a chosen parameter and may be increased or decreased depending on a desired accuracy/resource use tradeoff. A larger N yields an increased accuracy for channel estimation.

A soft cancellation factor $\alpha_i$ may be introduced where $0 \le \alpha_i \le 1$. The soft cancellation factor, $\alpha_i$, may be used in the above calculations such that instead of cancelling an entire signal $h_i x_i$, a signal fraction $\alpha_i h_i x_i$ is cancelled. Selecting a cancellation factor less than 1 makes iterative cancellation more robust to large errors in channel estimates. If the channel estimator is a biased estimator, a suitably chosen cancellation factor may help in bias removal.

A UE may be limited in the number of iterations it may perform during channel estimation. For example, the hardware in a UE may only be capable of performing a certain number of iterations within a particular time period. According to an aspect of the disclosure, an improved channel estimation engine uses iterative soft cancellation for improved channel estimation of weak cells in the presence of stronger interferers. The improved engine may be used with Long Term Evolution (LTE) systems. Iterative soft cancellation of pilot signals is used for accurate and robust cancellation with priority given to certain cell/antenna pairs. As shown in block 502 of FIG. 5, certain cells may be chosen to undergo iterative cancellation while others may be excluded. Cells which are chosen are ordered to improve cancellation results and resource utilization. Cells are classified and ordered based on certain metrics, such as reference signal (RS) power. Complexity constraints (such as a limited number of iterations within a certain time period) may be applied to improve or optimize the number of iterations for each cell and improve the obtained serving cell throughput. Signals from cells determined to be more important may undergo more iterations than signals from less important cells.

Cell classification and ordering may be accomplished in several ways. As shown in block 504 of FIG. 5, a pair may be created for each cell/antenna combination. For example, if a first cell has four antennas and a second cell has four antennas there are eight possible cell/antenna pairs for those two cells (i.e., first cell, first antenna; first cell, second antenna; first cell, third antenna; first cell, fourth antenna; second cell first antenna; second cell, second antenna; second cell third antenna; and second cell, fourth antenna. An example of this pairing is shown in FIG. 6. Three cells, Cell 1 602, Cell 2 612, and Cell 3 622 are shown. Each cell has three antennas. Cell 1 602 has Antenna A 604, Antenna B 606, and Antenna C 608. Cell 2 612 has Antenna A 614, Antenna B 616, and Antenna C 618. Cell 3 622 has Antenna A 624, Antenna B 626, and Antenna C 628. A UE within receiving distance of all three cells, shown in FIG. 6 would identify nine different antenna pairs:

(Cell 1, Antenna A)
(Cell 1, Antenna B)
(Cell 1, Antenna C)
(Cell 2, Antenna A)
(Cell 2, Antenna B)
(Cell 2, Antenna C)
(Cell 3, Antenna A)
(Cell 3, Antenna B)
(Cell 3, Antenna C)

However, the ultimate determination of which of the nine different antenna pairs a given UE identifies will depend on various factors relating to the three cells (e.g., geographic locations, signal power, cell IDs, etc.) as well as various factors relating to the UE (e.g., the location, configuration, and capabilities of the UE).

Figure 5:
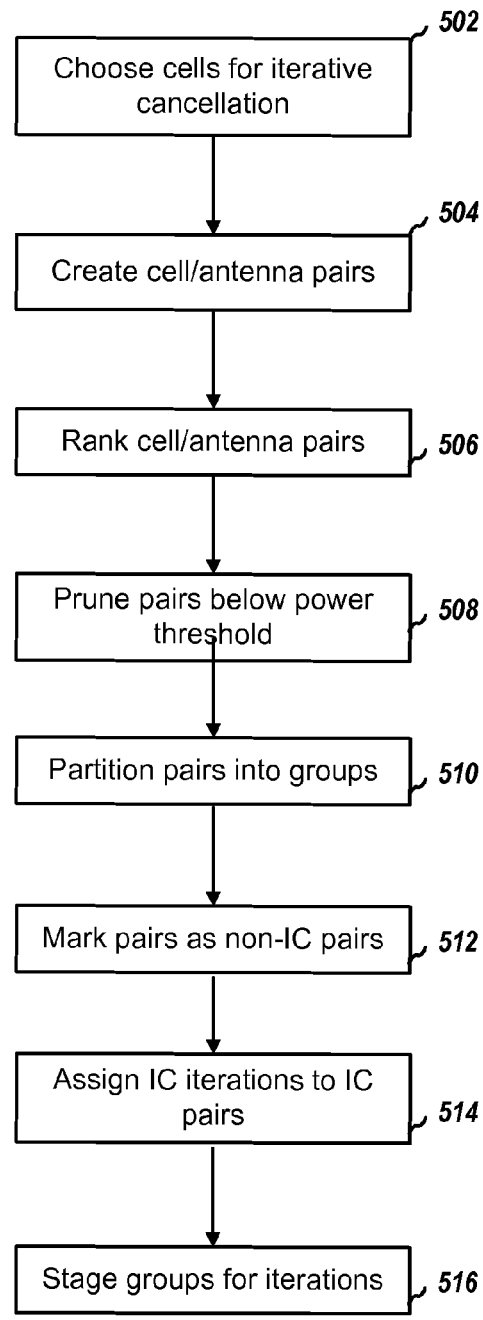
FIG. 5 is a block diagram illustrating a method for communicating in a wireless network according to one aspect of the disclosure.
Figure 6:
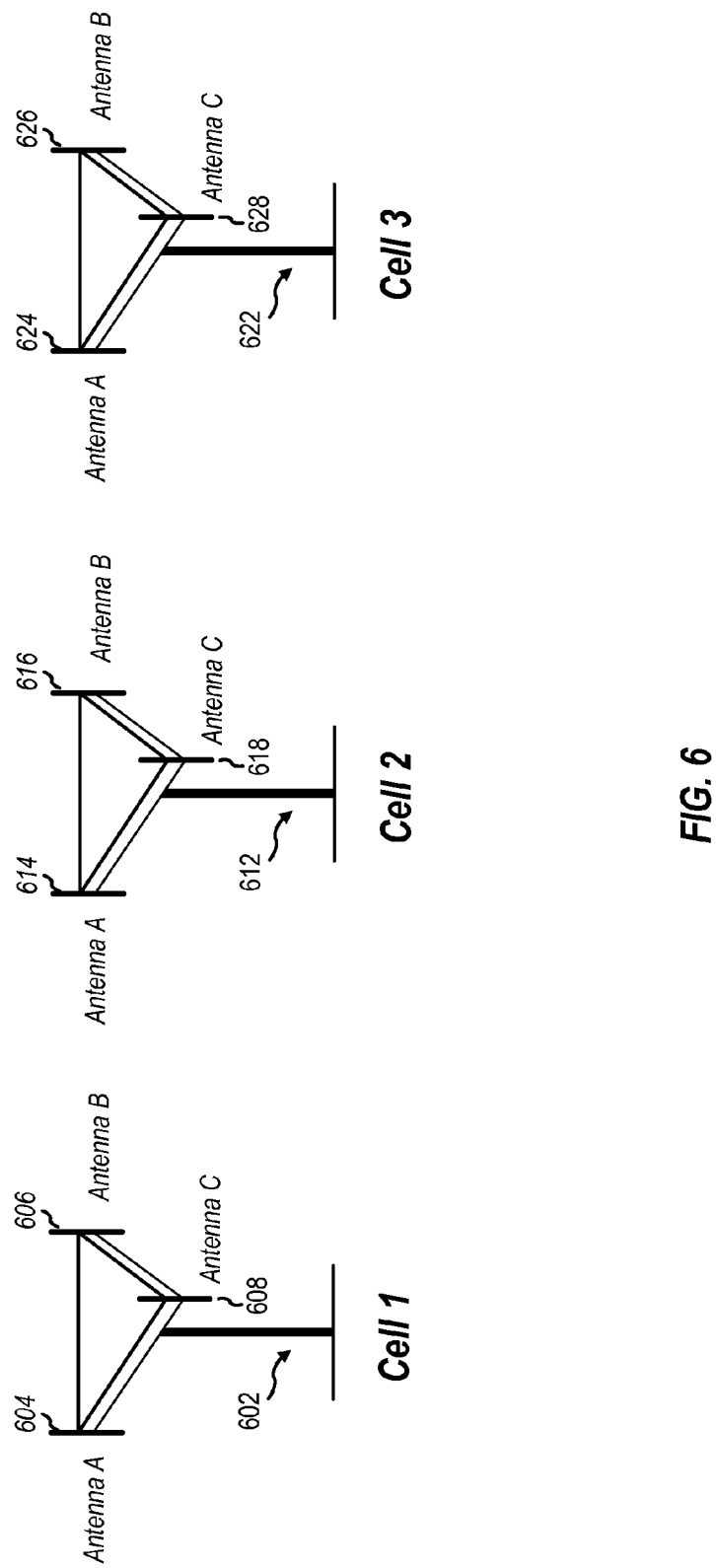
FIG. 6 is a block diagram illustrating cell-antenna pairs according to one aspect of the disclosure.

As shown in block 506 of FIG. 5, cell/antenna pairs may be ranked. A metric may be computed to rank the pairs. One such metric is reference signal (RS) power. Pairs may also be grouped into groups of pairs.

A threshold of transmission power may also be used to sort pairs. For example, as shown in block 508 of FIG. 5, an antenna of a cell that is below a certain configurable power threshold may be dropped from the input list and discarded for purposes of channel estimation. This technique may be used to prune lower power pairs and reduce the complexity of the eventual channel estimation method. The remaining pairs in the input list may be sorted in decreasing order according to a suitable metric, such as reference signal power.

As shown in block 510 of FIG. 5, the input list may then be partitioned into groups, where each group consists of pairs whose pilot tones occupy the same time-frequency resource (i.e., collide). For example, in LTE there are typically six resources on which pilots are sent. Antennas which use the same resource may be grouped. Groups that contain a pair of the serving cell are identified as serving-cell groups. Members of a serving-cell group may be estimated more accurately than other pairs, meaning given a fixed number of communication resources, more resources may be allocated to the serving-cell group than to other groups. Groups may be ranked according to one or more metrics including whether a group includes a serving cell cell-antenna pair, the number of iterative interference cancellation capable cells included in the group, or a sum of the powers of reference signals of iterative interference cancellation capable cells included in the group. Other metrics may also be used. Cell-antenna pairs within a group may also be ranked according to one or more metrics including whether a cell-antenna pair includes a serving cell, whether a cell-antenna pair includes an iterative interference cancellation capable cell, or the power of a reference signal of a cell-antenna pair. Other metrics may also be used.

As shown in block 512 of FIG. 5, certain cell/antenna pairs may be marked as non-iterative cancellation (non-IC) pairs. Interference caused by a non-IC pair is not cancelled out. Non-IC pairs are pairs that are too weak to estimate accurately even if stronger cells are cancelled out. Fake cells may also be marked as non-IC cells. Non-IC cells may be grouped, and criteria used to mark non-IC cells may be different across groups. Criteria for marking pairs as non-IC pairs may include reference signal power and whether the pair belongs to a serving group or non-serving group.

As shown in block 514 of FIG. 5, each pair to undergo iterative cancellation (IC pairs) may be assigned a number of iterations for cancellation purposes. Each pair may be given a number of parameters such as ($N_{max,s}$, $N_{min,s}$, $N_{max,ns}$, $N_{min,ns}$) where $N_{max,s}$ is the maximum number of iterations for a serving group, $N_{min,s}$ is the minimum number of iterations for a serving group, $N_{max,ns}$ is the maximum number of iterations for a non-serving group, and $N_{min,ns}$ is the minimum number of iterations for a non-serving group. Iteration numbers may be initially assigned and adjusted later to meet desired complexity constraints.

As shown in block 516 of FIG. 6, groups may then be staged to optimize the number of iterations performed for grouped pairs. Groups may be first ordered in descending order according to desired metrics. One metric for sorting groups may be whether the group contains the serving cell and/or the total reference signal power of IC pairs in the group.

For each group, two lists of stages are generated. A pair can appear in multiple stages if it is allocated more than one iteration. A stage is a single occurrence of a pair in an IC ordering. One stage list is for IC pair stages, which corresponds to the IC pairs, with each IC pair occurring as many times as that pair is to be iterated. For example, if there are two pairs, Pair1 and Pair2, each to be given three iterations, the IC stage list would be six stages long: {Pair1, Pair2, Pair1, Pair2, Pair1, Pair2}. The second stage list is for non-IC pair stages, which corresponds to all non-IC pairs in sorted order, each appearing once. Continuing the above example, if there was a third pair, Pair3, which was a non-IC pair, the non-IC stage list would be one stage long: {Pair3}.

Figure 7:
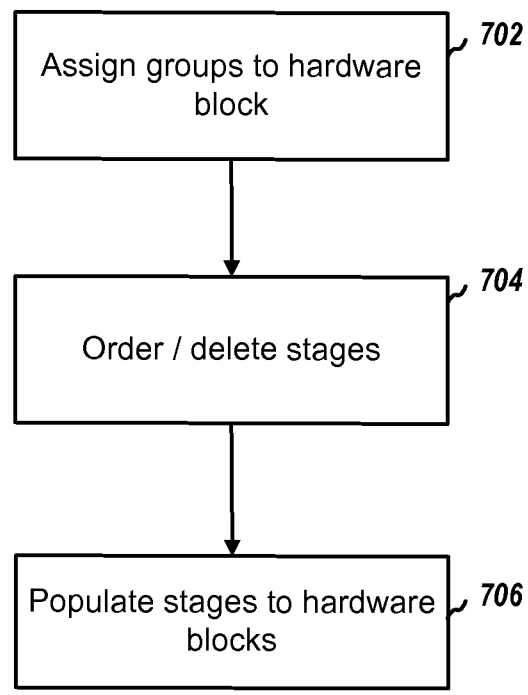
FIG. 7 is a block diagram illustrating a method for communicating in a wireless network according to one aspect of the disclosure.

For cancellation purposes, the groups (typically numbering six in an LTE environment) may be mapped/assigned to a hardware block to perform iterative channel estimation, as shown in block 702 of FIG. 7. This mapping may be configurable, permitting load balancing to improve processing efficiency. If more than one hardware block is available, groups may be assigned to hardware blocks in sequence. Where K is the total number of groups (such as six in LTE), group k, where $1 \leq k \leq K$ is assigned to the hardware block that is least loaded after assigning groups 1 to k−1. Other measures of loading may be defined as desired. For example, loading may be determined by taking into account that IC cells with a higher metric, such as higher sums of reference signal power, will create greater hardware loads. It may be desirable to assign groups to hardware blocks in as even a manner as possible to balance loads and avoid having too many important groups assigned to the same hardware block.

Certain hardware block constraints (such as a hardware block being limited to a certain number of stages within a certain time period) may result in deleting stages, as shown in block 704 of FIG. 7. Stages from less important groups may be removed first.

Ordered stages are populated to hardware blocks to perform the soft channel estimation, as shown in block 706 of FIG. 7. The ordered stage list is first populated with IC pairs of the groups in sorted order, followed by the non-IC pair list of the groups in sorted order. By grouping IC stages together in this manner, decoding of control/data channels may begin earlier (i.e., once estimation of IC pairs is completed). Earlier decoding occurs because non-IC pairs do not impact decoding because they are canceled out.

Following the assigning of ordered stages to hardware blocks, each hardware block will be assigned N stages. If N is too large for a particular hardware block, a pruning method may be used to meet desired complexity constraints. The pruning method may use a metric to rank different stages, and may successively prune lower ranked stages until a desired complexity constraint is met. The rank of a stage may be related to the rank of the group to which it belongs. Groups can be ranked in the ordered stage generation procedure described above. One way to constrain complexity of the method is to limit the number of stages assigned to each hardware block to be less than a target number.

Figure 8:
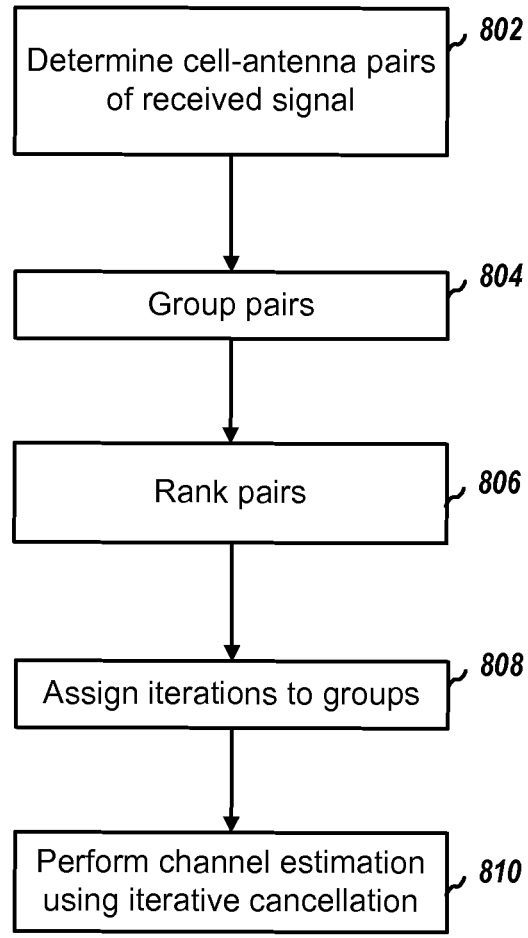
FIG. 8 is a block diagram illustrating a method for communicating in a wireless network according to one aspect of the disclosure.

FIG. 8 is a flow diagram illustrating channel estimation according to one aspect. A UE determines cell-antenna pairs associated with received transmissions in a received signal, as shown in block 802. The UE groups the cell-antenna pairs into groups, as shown in block 804. Each group includes cell-antenna pairs with colliding pilot tones. The UE ranks the groups according to a determined metric, as shown in block 806. The UE assigns a number of iterations to each ranked group, as shown in block 808. The UE performs channel estimation using iterative cancellation, as shown in block 810. In the iterative cancellation, received transmissions from cell-antenna pairs in a higher ranked group are iterated first, and received transmissions from cell-antenna pairs are iterated over their assigned number of times.

In one configuration, the UE 120 is configured for wireless communication including means for determining cell-antenna pairs associated with received transmissions in a received signal, means for grouping the pairs, means for ranking the groups, means for assigning iterations to each group, and means for performing channel estimation using iterative cancellation. In one aspect, the aforementioned means may be the processor(s), the controller/processor 480, the memory 482, the receive processor 458, the demodulators 454a and 454r, and the antennas 452a and 452r, configured to perform the functions recited by the aforementioned means. In another aspect, the aforementioned means may be a module or any apparatus configured to perform the functions recited by the aforementioned means.

Figure 9:
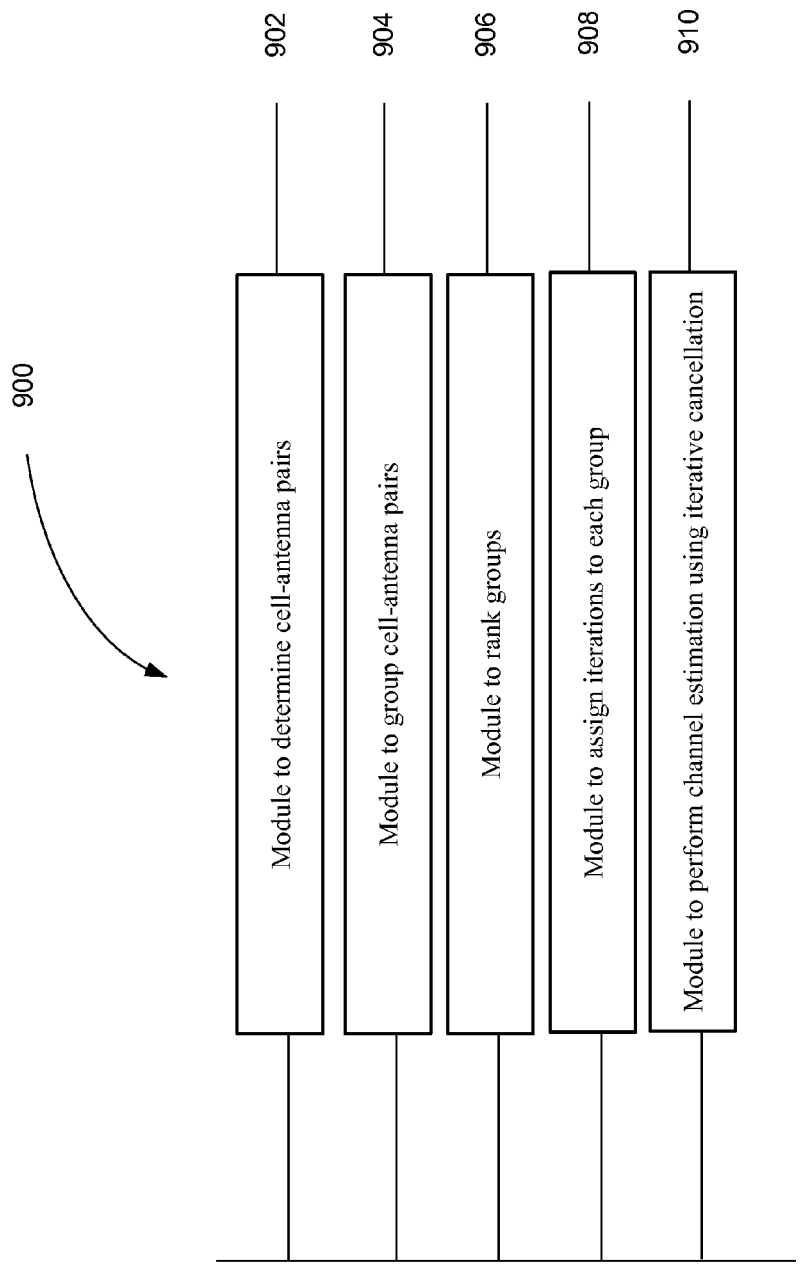
FIG. 9 is a block diagram illustrating components for communicating in a wireless network according to one aspect of the disclosure.

FIG. 9 shows a design of an apparatus 900 for a UE, such as the UE 120 of FIG. 4. The apparatus 900 includes a module 902 to determine cell-antenna pairs associated with received transmissions in a received signal. The apparatus also includes a module 904 to group the cell-antenna pairs into groups. Each group includes cell-antenna pairs with colliding pilot tones. The apparatus also includes a module 906 to rank the groups according to a determined metric. The apparatus also includes a module 908 to assign a number of iterations to each ranked group. The apparatus also includes a module 910 to perform channel estimation using iterative cancellation. In the iterative cancellation, received transmissions from cell-antenna pairs in a higher ranked group are iterated first, and received transmissions from cell-antenna pairs are iterated over their assigned number of times. The modules in FIG. 9 may be processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication in a wireless network, the method comprising:
   determining cell-antenna pairs associated with received transmissions in a received signal;
   grouping the cell-antenna pairs into groups, each group including cell-antenna pairs with pilot tones that occupy the same time-frequency resource;
   ranking the groups according to a determined metric;
   assigning a number of iterations to each ranked group; and
   performing, by a processor, channel estimation using iterative cancellation, in which received transmissions from cell-antenna pairs in a higher ranked group are iterated first, and received transmissions from cell-antenna pairs are iterated over an assigned number of times for each respective cell-antenna pair.

2. The method of claim 1 in which the determined metric is at least one of:
   whether a group includes a serving cell cell-antenna pair;
   a number of interference cancellation capable cells included in the group; and
   a sum of powers of reference signals of interference cancellation capable cells included in the group.

3. The method of claim 1 in which cell-antenna pairs within a group are ordered according to at least one of:
   whether a cell-antenna pair includes a serving cell;
   whether a cell-antenna pair includes an interference cancellation capable cell; and
   a power of a reference signal of a cell-antenna pair.

4. The method of claim 3 in which ordering cell-antenna pairs within a group comprises indicating a selected lower ranked cell-antenna pair as a non-iterative cancellation cell-antenna pair.

5. The method of claim 1, in which the iterative cancellation is performed by partially cancelling received transmissions during each iteration.

6. The method of claim 1 further comprising assigning zero iterations to received transmissions that fall below a defined signal strength parameter.

7. The method of claim 1 further comprising assigning iterations to hardware resources and adjusting assigned iterations to achieve a desired complexity constraint.

8. The method of claim 1 further comprising creating a processing stage which comprises one entry for each number of assigned times a received transmission is to be iterated.

9. An apparatus for wireless communication, comprising:
   means for determining cell-antenna pairs associated with received transmissions in a received signal;
   means for grouping the cell-antenna pairs into groups, each group including cell-antenna pairs with pilot tones that occupy the same time-frequency resource;
   means for ranking the groups according to a determined metric;
   means for assigning a number of iterations to each ranked group; and
   means for performing channel estimation using iterative cancellation, in which received transmissions from cell-antenna pairs in a higher ranked group are iterated first, and received transmissions from cell-antenna pairs are iterated over an assigned number of times for each respective cell-antenna pair.

10. The apparatus of claim 9 further comprising means for assigning iterations to hardware resources and means for adjusting assigned iterations to achieve a desired complexity constraint.

11. A computer program product for wireless communication in a wireless network, comprising:
   a non-transitory computer-readable medium having non-transitory program code recorded thereon, the program code comprising:
      program code to determine cell-antenna pairs associated with received transmissions in a received signal;
      program code to group the cell-antenna pairs into groups, each group including cell-antenna pairs with pilot tones that occupy the same time-frequency resource;
      program code to rank the groups according to a determined metric;
      program code to assign a number of iterations to each ranked group; and
      program code to perform channel estimation using iterative cancellation, in which received transmissions from cell-antenna pairs in a higher ranked group are iterated first, and received transmissions from cell-antenna pairs are iterated over an assigned number of times for each respective cell-antenna pair.

12. The computer program product of claim 11 further comprising program code to assign iterations to hardware resources and program code to adjust assigned iterations to achieve a desired complexity constraint.

13. An apparatus for wireless communication, comprising:
a memory comprising non-transitory computer executable instructions; and
at least one processor coupled to the memory, the at least one processor being configured, upon execution of the instructions:
- to determine cell-antenna pairs associated with received transmissions in a received signal;
- to group the cell-antenna pairs into groups, each group including cell-antenna pairs with pilot tones that occupy the same time-frequency resource;
- to rank the groups according to a determined metric;
- to assign a number of iterations to each ranked group; and
- to perform channel estimation using iterative cancellation, in which received transmissions from cell-antenna pairs in a higher ranked group are iterated first, and received transmissions from cell-antenna pairs are iterated over an assigned number of times for each respective cell-antenna pair.

14. The apparatus of claim 13 in which the determined metric is at least one of:
- whether a group includes a serving cell cell-antenna pair;
- a number of interference cancellation capable cells included in the group; and
- a sum of powers of reference signals of interference cancellation capable cells included in the group.

15. The apparatus of claim 13 in which cell-antenna pairs within a group are ordered according to at least one of:
- whether a cell-antenna pair includes a serving cell;
- whether a cell-antenna pair includes an interference cancellation capable cell; and
- a power of a reference signal of a cell-antenna pair.

16. The apparatus of claim 15 in which the at least one processor is further configured to indicate a selected lower ranked cell-antenna pair as a non-iterative cancellation cell-antenna pair.

17. The apparatus of claim 13, in which the iterative cancellation is performed by partially cancelling received transmissions during each iteration.

18. The apparatus of claim 13 in which the at least one processor is further configured to assign zero iterations to received transmissions that fall below a defined signal strength parameter.

19. The apparatus of claim 13 in which the at least one processor is further configured to assign iterations to hardware resources and adjusting assigned iterations to achieve a desired complexity constraint.

20. The apparatus of claim 13 in which the at least one processor is further configured to create a processing stage which comprises one entry for each number of assigned times a received transmission is to be iterated.

* * * * *